United States Patent

Hamm et al.

[11] 4,355,688
[45] Oct. 26, 1982

[54] AGRICULTURAL IMPLEMENT AND DEPTH CONTROL THEREFOR

[75] Inventors: Nicholas Hamm, Vineland; John Rosbak, Fonthill, both of Canada

[73] Assignee: Deere & Company, Moline, Ill.

[21] Appl. No.: 229,399

[22] Filed: Jan. 29, 1981

[51] Int. Cl.² .......................................... A01B 63/114
[52] U.S. Cl. ...................................................... 172/4
[58] Field of Search .................. 172/4, 26, 424, 430; 56/10.2, DIG. 10, DIG. 15; 37/DIG. 1; 180/131; 104/244.1

[56] References Cited

U.S. PATENT DOCUMENTS

| | | | |
|---|---|---|---|
| 2,755,721 | 7/1956 | Rusconi | 172/4 |
| 2,830,518 | 4/1958 | Kassel | 172/4 |
| 3,658,133 | 4/1972 | Sweet et al. | 172/4 |
| 4,176,721 | 12/1979 | Poggemiller et al. | 172/4 |
| 4,228,860 | 10/1980 | Orthman | 172/26 |

FOREIGN PATENT DOCUMENTS

| | | | |
|---|---|---|---|
| 2261558 | 7/1974 | Fed. Rep. of Germany | 56/10.2 |
| 40888 | 7/1958 | Poland | 172/4 |
| 127087 | 7/1959 | U.S.S.R. | 172/4 |

Primary Examiner—Richard T. Stouffer

[57] ABSTRACT

A depth control system for a disk tiller or similar groundworking implement having a gang of tillage tools adjustably supported from a main frame. A trailing support arm is rigidly connected to the gang and pivotally carries a gauge wheel spring-biased into engagement with the tilled soil. As the depth of the tools varies with changing conditions, the support arm moves and the gauge wheel pivots with respect to the arm to rotate a first lever. The first lever is operably connected to a second lever by a pair of pretensioned springs. Movement of the second lever moves a switch activating arm which activates one of a pair of microswitches. The microswitches control solenoid valves to operate a depth control cylinder for the gang and maintain the desired depth of cut. The switch activating arm is dampened by a dashpot which, together with the springs, prevents switch activation during short periods of oscillation.

12 Claims, 4 Drawing Figures

AGRICULTURAL IMPLEMENT AND DEPTH CONTROL THEREFOR

BACKGROUND OF THE INVENTION

The present invention relates generally to ground working agricultural implements and more specifically to implements in which a desired penetration of the ground working members can be maintained within a preselected range.

As ground working implements are moved over a field, changes in conditions can cause the depth of the tools to vary. For example, the weight of a seeding implement may decrease as the seed or fertilizer supply becomes exhausted. Accordingly, the disk openers of the seeding implement will not penetrate the ground to the same depth as they did when the implement carried a full supply of seed and fertilizer. Variations in soil hardness or density can also affect the depth of penetration of such tools, as can ground contours. Changes in the depth of penetration can also occur if an implement control cylinder leaks internally.

A seeding tiller is a particular example of an implement in which it is desirable to carefully maintain the tilling depth of disks so that seeds are planted at the desired uniform depth. A typical seeding tiller, such as the John Deere Model 1900 Seeding Tiller, includes a tiller frame supported on two furrow wheels and a land wheel. The frame carries a seed and fertilizer box and a distribution system. Disk gangs are connected to the frame for pivoting about a horizontal axis. A hydraulic cylinder pivots the gangs to control the depth of cut of the disks. Normally the cylinder is connected directly to a lever-operated hydraulic control on the towing vehicle for manual adjustment by the operator. As soil conditions change and as the weight of contents of the seed and fertilizer box change, the depth of penetration will vary. To maintain the desired uniform planting depth, the operator must continually adjust the gangs by operating the control lever.

Although various devices for automatically sensing and adjusting the cutting depth of the disks have been devised, none have been entirely satisfactory. Numerous devices utilize a gauge wheel which rides on the untilled ground forwardly of the tiller frame. Often, such devices require complicated linkages and they do not accurately sense the difference in elevation between the surface of the tilled ground and the bottom of the disk.

It is therefore an object of the present invention to provide an improved automatic depth control system for a tillage implement.

It is another object of the present invention to provide an improved depth control device for an implement which automatically maintains a preselected tillage depth.

It is a further object of the invention to provide an improved depth control device for a seeding tiller with disk gangs pivotally connected to a mobile frame for rocking up and down about a generally horizontal axis.

It is another object to provide such a device which is relatively simple in construction and yet is able to sense the difference in elevation between the tilled ground and the bottom of the disks.

It is yet another object of the present invention to provide an improved and dependable switching device responsive to the pivoting of a ground wheel assembly about a horizontal axis to activate an electro-hydraulic depth control.

It is yet another object to provide such a switching device with improved adjusting and dampening means for smooth and accurate depth control, particularly in the contaminated environment within which agricultural implements operate.

It is still a further object of the invention to provide a depth sensing unit for a tillage implement wherein the sensing unit is connected directly to and extends rearwardly from the tool-carrying frame of the implement to sense the difference in elevation between the surface of the tilled ground and the bottom of the tillage tools.

These and other objects, features and advantages will be apparent to those skilled in the art from the following detailed description taken with the attached drawings.

DESCRIPTION OF THE PREFERRED EMBODIMENT

Figure 1:
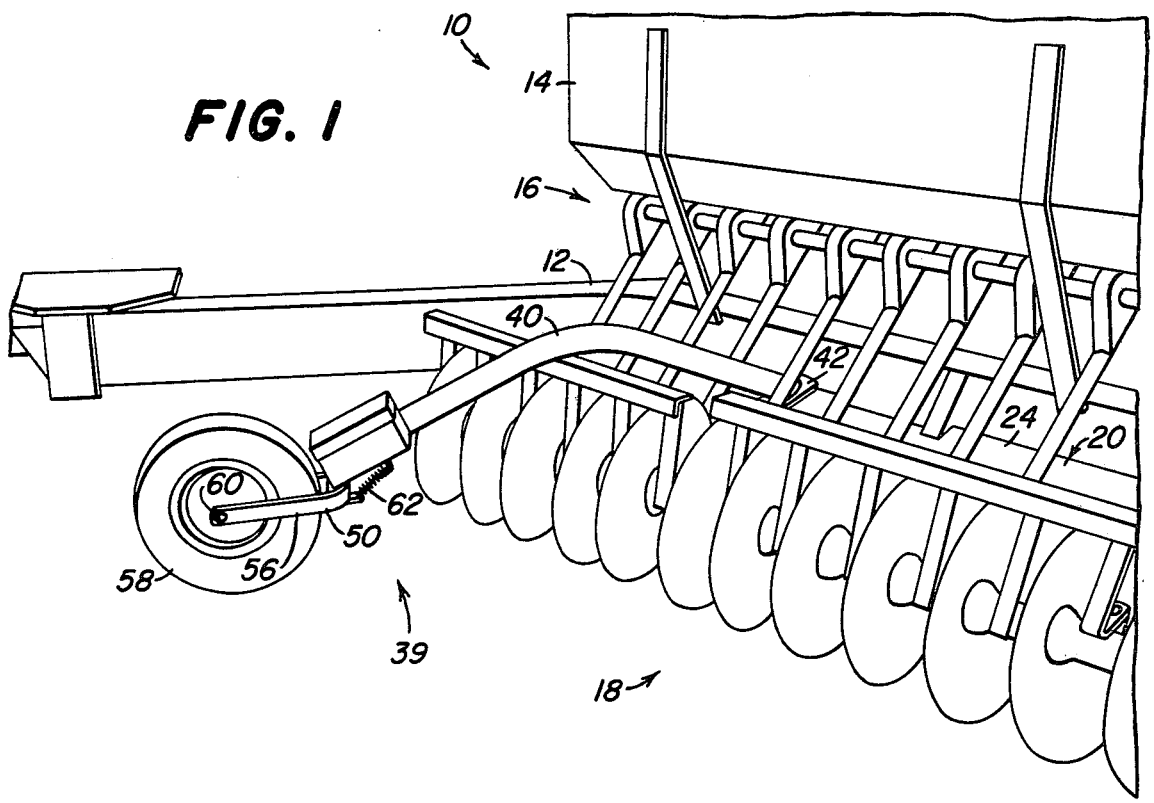
FIG. 1 is a perspective view of a portion of a seeding tiller with which the depth control device is combined.
Figure 2:
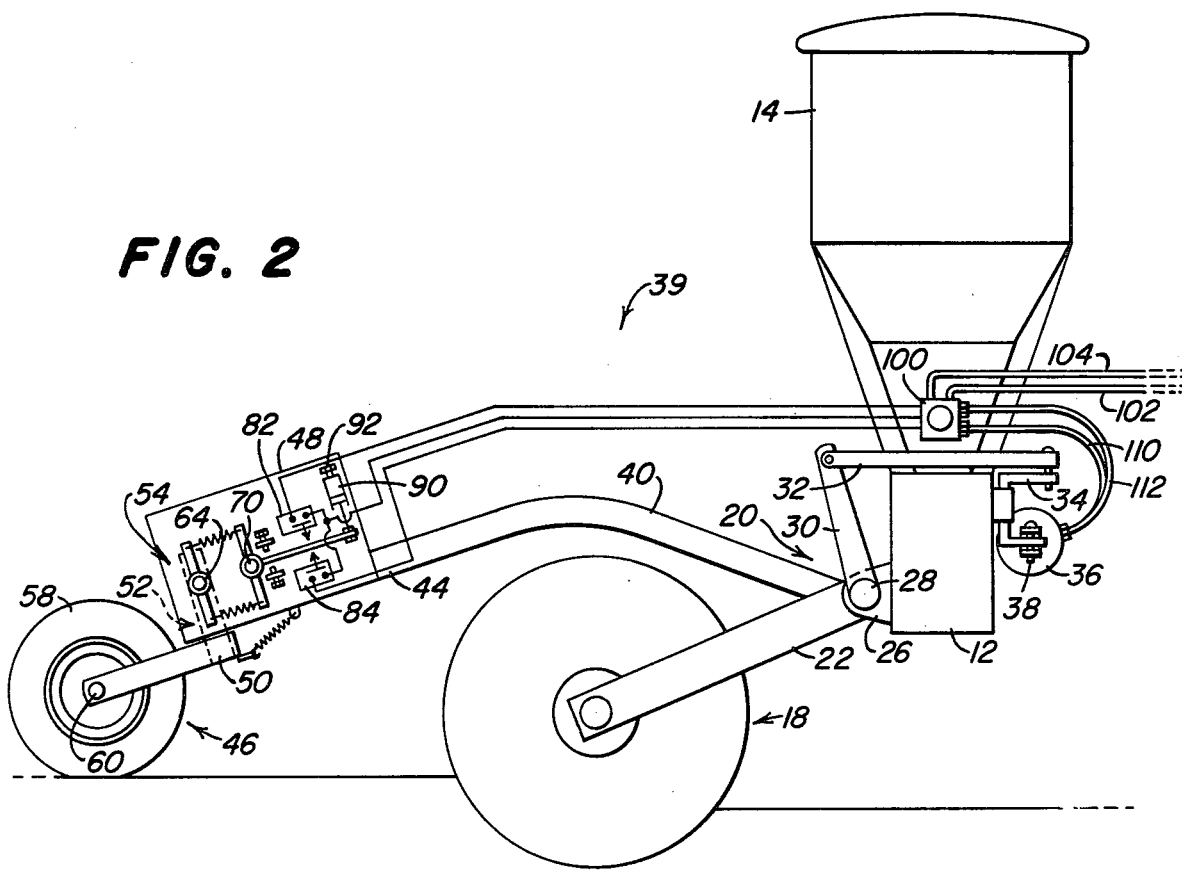
FIG. 2 is a schematical representation of the depth control system.

Referring to FIGS. 1 and 2, there is shown a portion of a conventional seeding tiller 10 having a tiller frame 12 supported on furrow and land wheels (not shown) for forward movement over the ground. Mounted on the frame 12 are a seed and fertilizer box 14 and a distribution system 16. One tiller 10, or two or more such tillers can be pulled behind a single towing vehicle.

Disk gangs or earthworking tools 18 are carried on individual gang frames 20. Each gang frame 20 includes fore-and-aft lift arms 22 rigidly connected at their fore ends to a main transverse rocking beam 24. The rocking beam 24 is pivotally coupled to a pivot shaft 28 by torsion springs to allow each gang to flex independently of the other to follow the ground contour and move over obstructions. Shock absorbers can be added to the torsion springs to dampen gang motion. The aft ends of the arms 22 journal the disk gang 18. The pivot shaft 28 is pivotally connected to the frame 12 by brackets 26. A lever 30 is rigidly connected to and extends upwardly from the pivot shaft 28. A fore-and-aft extending rod 32 is pivotally connected at its aft end to the upper end of the lever 30 and at its fore end to a crank 34. A hydraulic cylinder 36 is anchored at its cylinder end to the frame 12 and has a rod end 38 connected to the crank 34. As the cylinder is extended, the crank 34 and the rod 32 are moved forwardly (FIG. 2) to pivot the lever 30, beam 24 and lift arms 22 in the clockwise direction to thereby raise the disk gangs 18 and decrease the soil penetration of the tools. Retracting the cylinder moves the crank 34 and the rod 32 rearwardly to lower the disk gangs 18 and increase soil penetration. This hydraulic-mechanical linkage for raising and lowering the disk gang is old in the art an can be found on implements such as the aforementioned John Deere Model 1900 Seeding Tiller.

A depth control sensing unit 39 includes an elongated support arm 40 rigidly connected at its fore end to the rocking beam 24 by a bracket 42. The arm 40 extends rearwardly and upwardly over the groundworking tools and angles downwardly to an end portion 44 behind the tools and above the tilled ground. A gauge wheel assembly 46 and a control box 48 are connected to the end portion 44 of the arm 40.

The gauge wheel assembly 46 includes a gauge arm 50 which is connected to the end portion 44 of the support arm 40 by an upright castering pivot 52 and a horizontal pivot 54. The gauge arm 50 includes a rearwardly extending yoke 56 which supports a ground wheel 58 for rotation about a horizontal axle 60. A spring 62 is tensioned between the gauge arm 50 and the support arm 40 to bias the arm 50 in the counterclockwise direction (as viewed in FIG. 2) about the pivot 54 to maintain the wheel 58 in contact with the tilled ground as the end 44 of the support arm 40 rocks about the pivot 28. The gauge wheel assembly 46 can caster about the pivot 52 during turns.

Figure 3:
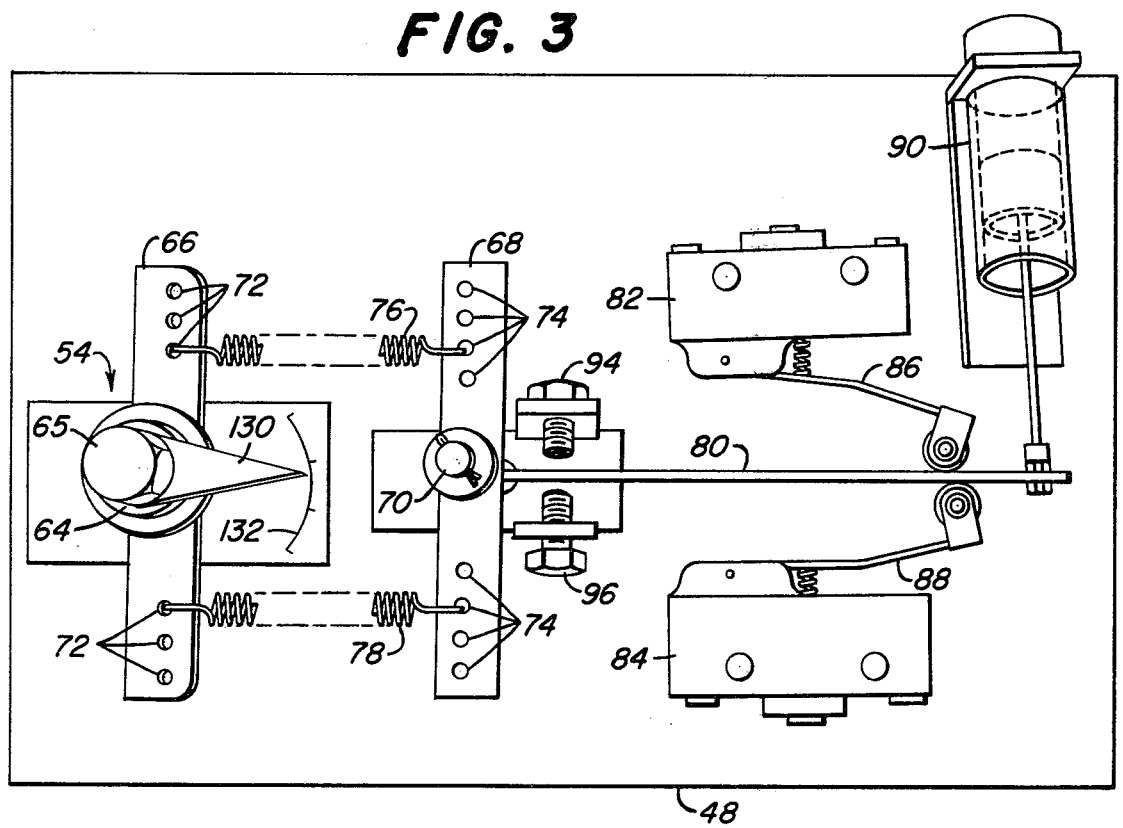
FIG. 3 is a detailed side view of the control box used in the depth control system.
Figure 4:
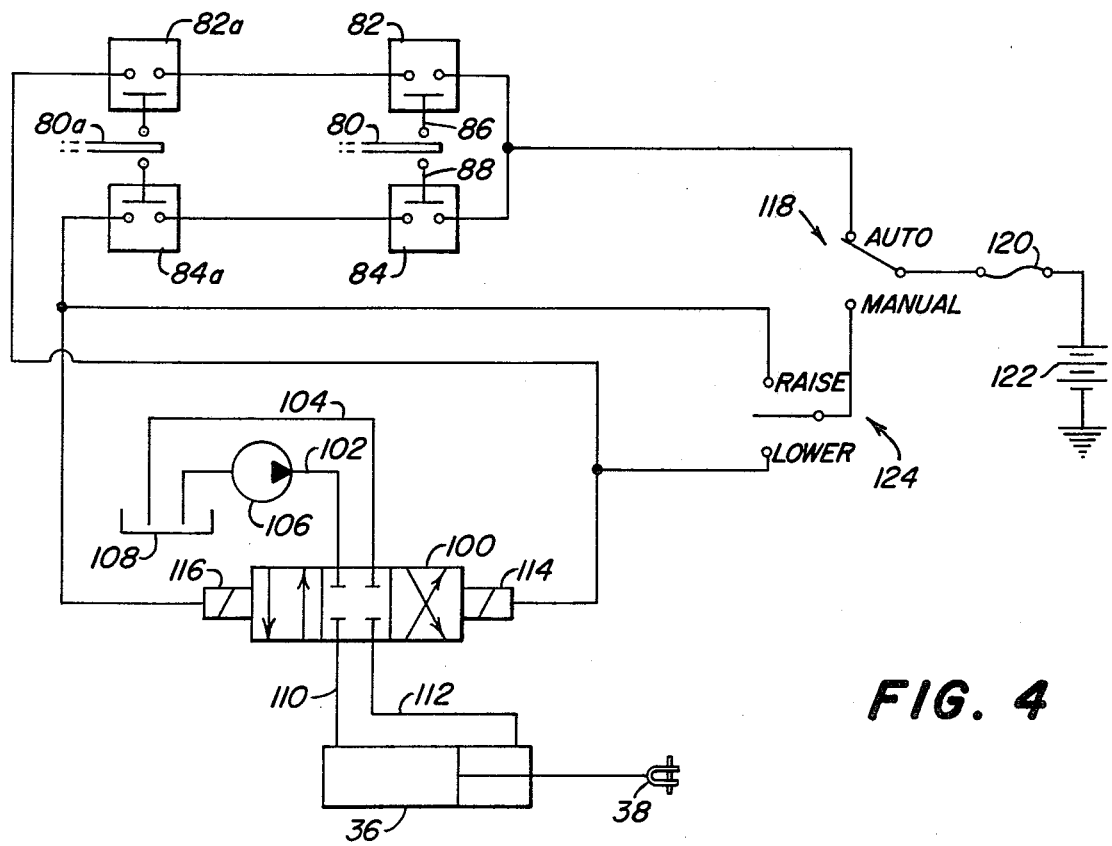
FIG. 4 is a schematic of the electric and hydraulic circuits of the depth control system shown in FIG. 2, but including a pair of control boxes connected in series.

Looking now to FIGS. 3 and 4, it will be seen that the pivot 54 includes an adjustable pivot pin 64 which extends into the control box 48 and pivots with the gauge wheel assembly 46 about the horizontal axis. The relative position of the pivot pin 64 with respect to the pivot 54 may be adjusted by loosening a cap screw 65. A first lever 66 is connected for rocking with the pivot pin 64 about its axis. A second lever 68 is rockably connected to a pivot pin 70 which has its axis parallel with the axis of the pivot 54.

The first and second levers 66 and 68 include paired apertures 72 and 74, respectively, which are vertically spaced on each side of the corresponding pivot pins 64 and 70. Springs 76 and 78 are inserted through a preselected set of paired holes 72 and 74 and are pretensioned between the levers 66 and 68 to urge the second lever 68 to pivot with the first lever 66. The angular relationship between the levers 66 and 68, as well as the relative angle through which the levers rotate, is adjustable by selecting different sets of holes 72 and 74 in which to mount the springs 76 and 78.

A switch actuating arm 80 is connected to and pivots with the second lever 68. Microswitches 82 and 84 are supported by the control box 48 on either side of the arm 80, and include actuators 86 and 88 which lie in the arc that the arm 80 oscillates through as the lever 68 is pivoted. An air dashpot 90 is supported by the box 48 and is connected to the end of the switch actuating arm 80. The amount of switch arm dampening is regulated by an adjustable screw 92 (FIG. 2). Adjustable stops 94 and 96 which include screws threaded through supports mounted in the box 48 limits the amount of pivoting of the lever 68 and switch activating arm 80.

As the support arm 40 moves downwardly with increased penetration of the tools, the gauge wheel assembly 46 rocks upwardly about the pivot 54. The first lever 66 pivots in the clockwise direction and urges the second lever 68 and the switch actuating arm 80 in the clockwise direction about the pivot 70. The arm 80 moves downwardly and depresses the actuator 88 to switch on the microswitch 84. As the soil penetration of the tools decreases, the support arm 40 moves upwardly, and the gauge wheel assembly pivots in the counterclockwise direction about the pivot 54. The first lever 66, and the second lever 68 and switch actuating arm 80, rock in the counterclockwise direction to activate the microswitch 82. The flexible link between the levers 66 and 68 formed by the springs 76 and 78, as well as the adjustable stops 94 and 96, protect the microswitches when the gauge wheel 58 rocks up or down excessively over rocks, rough terrain or the like. The dashpot 90 provides an averaging effect and helps to prevent the switch actuating arm from responding to every local soil irregularity.

The microswitches 82 and 84 are connected to an electrohydraulic control valve 100 which controls the cylinder 36. Hydraulic lines 102 and 104 extend between the valve 100 and a hydraulic pump 106 and reservoir 108 on the towing vehicle. Lines 110 and 112 connect the valve 100 with the anchor and rod ends, respectively, of the cylinder 36.

The microswitches 82 and 84 are connected in series between "lower" and "raise" solenoids 114 and 116, respectively, and a mode switch 118 located on the towing vehicle. The switch 118 is connected through a fuse 120 to a voltage source 122 on the vehicle. In a first or "Auto" position, the switch 118 connects the microswitches with the voltage source 122 for automatic depth control. In second or "Manual" position, the voltage source 122 is connected to a momentary rocker switch 124 for manually controlling the "lower" and "raise" solenoids 114 and 116.

More than one sensing unit 39, including a support arm 40, a gauge wheel assembly 46 and a control box 48, may be utilized to achieve a truer average ground level response. The microswitches 82a and 84a (FIG. 4) for the additional sensing unit or units are connected in series with the microswitches 82 and 84. The additional unit or units help to prevent unwanted response to soil irregularities when the switch 118 is in the "Auto" position because all switches 82 and 82a, or 84 and 84a, must be turned on by the arms 80 and 80a for the valve 100 to be activated. Therefore, if only one of the gauge wheels 58 on a first sensing unit 39 moves over an irregularity, such as a clod or a buildup of trash, the automatic level control will not respond if a second sensing unit has neither microswitch turned on, or if the response called for by the second sensing unit differs from that of the first.

To change from automatic to manual cutting depth control, the operator moves the mode switch 118 to the "Manual" position. By rocking the switch 124 to the "Raise" or "Lower" position, the operator can selectively activate the solenoid 116 or 114 respectively to extend or retract the cylinder 36 and raise or lower the tools 18.

During operation in the automatic depth control mode, the tiller 10 is pulled forwardly through the field, and the tools 18 penetrate the soil at the preselected depth determined by the position of the pivot pin 64 with respect to the pivot 54. The relative position is adjusted by loosening the cap screw 65 and rotating the pivot pin 64 with respect to the pivot 54 to the selected position. A pointer 130 is fixed to the pivot pin 64 and indicates the selected position on a scale 132. As the tools 18 begin to penetrate the soil at a depth less than the preselected depth, the arm 40 swings upwardly with the gang frame 20. The gauge wheel assembly 46 pivots in the counterclockwise direction about the pivot 54 to maintain the gauge wheel 58 in contact with the ground. The switch activating arm 80 is urged upwardly against the actuator 86 to turn on the microswitch 82. The "lower" solenoid 114 is activated (assuming that only a single depth sensing unit 39 is utilized) to retract the cylinder 36 and lower the tools 18. As the tools penetrate the soil more deeply, the support arm swings downwardly causing the gauge wheel assembly 46 to pivot in the clockwise direction until the switch actuating arm 80 moves downwardly a sufficient amount to permit the switch 82 to return to its normally off condition. The valve 100 returns to its closed-center position to prevent the gang frame 20 from pivoting.

When the tools 18 penetrate the soil more deeply, the rear end of the support arm 40 will drop and pivot the gauge wheel assembly 46 in the clockwise direction until the arm 80 causes the microswitch 84 to turn on. Turning on the microswitch 84 activates the "raise" solenoid to extend the cylinder 36 and rock the gang frame 20 to raise the tools 18. The gauge wheel assembly 46 pivots in the counterclockwise direction as the end of the arm 40 rocks upwardly until the preselected depth is reached. The microswitch 84 is turned off and the valve 100 returns to the closed-center position to prevent further rocking of the frame 20.

The arm 40 is longer than the lift arms 22 so that a small vertical movement of the gang 18 will result in an amplified movement of the end 44 of the arm 40. The gauge wheel 58 travels over the tilled soil and changes of a fraction of an inch in the depth of the tilled soil can be accurately detected.

The depth control system requires only one set of hydraulic hoses, even if two or more tillers are being towed. In the manual mode, each tiller can be controlled independently from the vehicle by a separate rocker switch 124. In the automatic mode, each tiller is controlled automatically by its own depth control system.

In the preferred embodiment, the support arm 40 is located adjacent the rearmost gang 18 so the gauge wheel rides just inside the furrow. When a second depth sensing unit is utilized, it is offset laterally from the first unit. The microswitches 82a and 84a (FIG. 4) are connected in series with the microswitches 82 and 84 so that a "raise" signal is provided to the valve 100 only when both switches 84 and 84a are on. A "lower" signal occurs only when both switches 82 and 82a are on.

Neither of the valve solenoids 114 and 116 is activated when the sensed tillage depth is within an acceptable range wherein the arm 80 is located between the actuators 86 and 88. The range is adjustable by varying the relative locations of the springs 76 and 78 to change the effective moment arms of the levers 66 and 68.

Having described the preferred embodiment, it will be apparent that modifications can be made without departing from the scope of the invention as defined in the accompanying claims.

We claim:

1. In an earthworking implement, a main frame supported for forward movement over the ground, an earthworking tool assembly having a tool frame and soil penetrating tools connected to the tool frame, means for rockably connecting the tool frame to the main frame, power means for rocking the tool frame to raise and lower the tools with respect to the main frame to vary the depth of penetration of the tools, a fore-and-aft extending support arm fixed at one end to the tool frame forwardly of the soil penetrating tools for rocking therewith and extending rearwardly from said one end up and over the soil penetrating tools to an opposite end thereof spaced rearwardly from the tool assembly, said opposite end movable vertically as the tool frame is raised and lowered, depth gauging means extending downwardly from said opposite end of the support arm so as to be movable into contact with the soil for sensing the position of the arm relative to the ground, said depth gauging means comprising a wheel connected to said opposite end of the arm for castering about an upright axis and for rocking vertically about a generally horizontal transverse axis adjacent the upright axis as the support arm rocks, and means responsive to the rocking of the caster wheel about said transverse axis for providing a signal indicative of whether the depth of penetration of the tools is above or below a preselected range, and wherein said power means is responsive to the signal for rocking and tool frame to maintain the depth of penetration of the tools within the preselected range.

2. The invention as set forth in claim 1 wherein the tool frame is connected to the main frame for rocking about a generally transverse axis and the arm is connected to the tool frame adjacent said transverse axis and extends rearwardly therefrom so that the wheel is positioned to be urged into rolling contact with the tilled soil.

3. In an earthworking implement, a main frame supported for movement over the ground, an earthworking tool assembly having soil penetrating tools, said assembly pivotally connected to the frame for swinging about a first generally horizontal axis, a fore-and-aft extending arm having one end connected to the earthworking tool assembly for swinging therewith and having the other end rockable between a raised and a lowered position as the tool assembly swings about the axis, a wheel assembly movably connected near the other end of the arm, said wheel assembly including a ground-engaging wheel, and means for moving the wheel assembly for urging the wheel into ground contact as the other end of the arm rocks between its positions, controllable power means connected to the earthworking tool assembly for swingably positioning the latter and adjusting the tool penetration, and control means for sensing the movement of the wheel assembly and responsive to said movement to control the power means, wherein said control means comprises a first lever swingable with pivoting of the wheel assembly about a first pivotal axis and a second lever spaced from and swingable in substantial unison with the swinging movement of the first lever about a second pivotal axis substantially parallel to the first axis, and spring means between the first and second levers for urging the second lever to move in substantial unison with the first lever.

4. The invention as set forth in claim 3 wherein the other end of the arm extends rearwardly of the tools so that the ground wheel is positioned to be urged into engagement with the tilled soil.

5. The invention as set forth in claim 3 further comprising means for dampening the pivoting of the second lever.

6. In an earthworking implement comprising:
   a mobile frame;
   a lift arm carried by the frame and rockable about a generally horizontal axis between raised and lowered positions;
   tool means movable with the lift arm for penetrating the ground at a depth dependent on lift arm position;
   a support arm connected for movement with the lift arm;
   a gauge wheel assembly pivotally connected to and movable with the support arm, said assembly including a ground-engaging wheel and means for urging said wheel into contact with the ground;
   a lever connected to and rockable with the gauge wheel assembly;

an actuating arm connected to and rockable with the lever between first and second positions;

switch means effective to provide first and second signals as the actuating arm rocks to its respective first and second positions;

spring means connected between the lever and the actuating arm for urging the actuating arm to move with the lever and dampener means connected to the actuating arm for preventing the switch means from being responsive to intermittent oscillations of the gauge wheel assembly; and power means responsive to the first and second signals for adjustably rocking the lift arm between its raised and lowered positions.

7. The invention as set forth in claim 6 further comprising means for selectively varying the relative positions of the lever and the gauge wheel assembly to adjust the preselected depth.

8. The invention as set forth in claim 7 wherein the means for selectively varying the relative position comprises adjustable securing means for selectively connecting the lever in one of a plurality of positions with respect to the gauge wheel assembly.

9. The invention as set forth in claim 6 further comprising means for adjusting the amount of rocking of the actuating arm relative to the lever.

10. In an earthworking implement, a main frame supported for forward movement over the ground, an earthworking tool assembly having soil penetrating tools, said assembly pivotally connected to the frame for swinging about a first generally horizontal axis, a fore-and-aft extending arm having one end connected to the earthworking tool assembly for swinging therewith and having the other end rockable between a raised and a lowered position as the tool assembly swings about the axis, a wheel assembly movable connected near the other end of the arm, said wheel assembly including a ground-engaging wheel, and means for moving the wheel assembly for urging the wheel into ground contact as the other end of the arm rocks between its positions, controllable power means connected to the earthworking tool assembly for swingably positioning the latter and adjusting the tool penetration, and control means for sensing the movement of the wheel assembly and responsive to said movement to control the power means, wherein said control means comprises a first lever swingable with pivoting of the wheel assembly and a second lever spaced from and swingable in substantial unison with the swinging movement of the first lever, spring means between the first and second levers for urging the latter to move in substantial unison with the first lever, and means for dampening the pivoting of the second lever.

11. The invention as set forth in claim 10 wherein the other end of the arm extends rearwardly of the tools so that the ground wheel is positioned to be urged into engagement with the tilled soil.

12. The invention as set forth in claim 10 wherein the first and second levers are swingable about substantially parallel pivotal axes.

* * * * *